No. 611,810. Patented Oct. 4, 1898.
F. H. HEISE.
COAL WINNING MECHANISM.
(Application filed June 17, 1898.)
(No Model.)
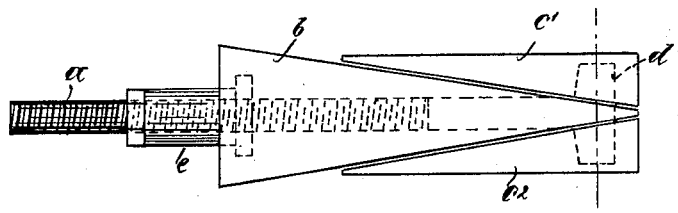
Fig. 1.
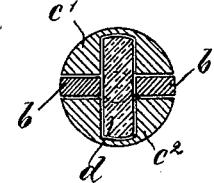
Fig. 2.
Witnesses:
E. R. Bolton
Inventor:
Fritz Hermann Heise
By 
his Attorneys.

UNITED STATES PATENT OFFICE.

FRITZ HERMANN HEISE, OF GELSENKIRCHEN, GERMANY.

COAL-WINNING MECHANISM.

SPECIFICATION forming part of Letters Patent No. 611,810, dated October 4, 1898.

Application filed June 17, 1898. Serial No. 683,714. (No model.)

*To all whom it may concern:*

Be it known that I, FRITZ HERMANN HEISE, a subject of the King of Prussia, German Emperor, residing at Gelsenkirchen, in the Kingdom of Prussia, German Empire, have invented certain new and useful Improvements in Coal-Winning Mechanism, of which the following is a specification.

My invention relates to an improvement in apparatus of the kind described in my United States Patent No. 601,467.

The apparatus described in the above-cited patent is characterized by the fact that two wedges of a displacement in opposite directions are mounted immediately on the two ends of a screw-spindle, whereby all other connection pieces are avoided. Thereby the parts are connected in such a manner that the outer plates of the wedge must be parallel in their moving from one another, that a uniform pressure is created over the whole length of the wedge in the movement of the spindle, and that there is attained a certain release of both wedges when the screw-spindle is revolved back again. In the new mechanism the arrangement of the screw-spindle with respect to the wedges is such that the one end of the screw-spindle bears two wedges. The one wedge has bored through it a smooth hole through which the screw-spindle passes and bears at one end of the said wedge a nut revoluble against the same, the threading of which nut corresponds to that of the spindle. The other end of the spindle is shaped in T form and the projections of the said end engage in corresponding cavities in two wedges in such a manner that the displacement of the said wedges both upward and downward becomes possible. When the nut is revolved, the first-named wedge, which is on the thin end forked, is caused to pass between the other two wedges in such a manner that the forked projections of the first wedge allow the projecting T-piece of the spindle to pass between them.

The invention is illustrated in the accompanying drawings, in which—

Figure 1 is a view of the wedge mechanism. Fig. 2 is a section of Fig. 1 on the line $xx$.

The screw-spindle $a$ passes through the smooth-bore hole of the wedge $b$, having the nut $e$ revolubly connected therewith. The thread of the nut $e$ engages with that of the spindle $a$. The other end of the spindle $a$ is T-shaped. The two projections $d$ of the T-piece engage in corresponding cavities of the auxiliary wedges $c'$ $c^2$ (shown in dotted lines in Fig. 1 of the drawings) and hold these wedges in such a position that they can be moved upward and downward. The wedges $c'$ $c^2$ lie with their outer surfaces parallel in the original position of the mechanism supported upon the inclined surfaces of the wedge $b$. When the nut $e$ is revolved, the wedge $b$ advances between the wedges $c'$ $c^2$ in such a manner that the forked projections of the said wedge permit the parts $d$ to pass between them. The two outer wedges are moved with parallel outer surfaces. In addition to the uniform pressure obtained over the whole length of the wedges upon the advance of the nut $e$ and of the certain release of the wedges on the reversal of the same my improvement has the special advantage that the lift obtainable thereby is relatively large, because the wedge $b$ in consequence of its special form can move a considerable distance over the connecting-point of the wedges $c'$ $c^2$ with the spindle $a$. Moreover, the spindle remains continuously parallel to the application surface of the wedge, and therefore in the position most favorable for this action.

Having now particularly described and ascertained the nature of my said invention and in what manner the same is to be performed, I declare that what I claim is—

In combination, the single wedge $b$ having a longitudinal opening, the bolt or spindle passing through said opening and having lateral projections at one end, the two side wedges engaging said projections and having parallel outer faces, and the nut threaded upon the opposite end of the spindle, substantially as described.

In witness whereof I have hereunto set my hand in presence of two witnesses.

FRITZ HERMANN HEISE.

Witnesses:
 WILLIAM ESSENWEIN,
 GEORGE P. PETTIT.